(12) United States Patent
Masuda et al.

(10) Patent No.: US 7,028,237 B2
(45) Date of Patent: Apr. 11, 2006

(54) INTERNAL BUS TESTING DEVICE AND METHOD

(75) Inventors: Masashi Masuda, Kawasaki (JP); Akio Hara, Kawasaki (JP); Kohji Kitagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 551 days.

(21) Appl. No.: 10/385,527

(22) Filed: Mar. 12, 2003

(65) Prior Publication Data

US 2004/0078672 A1  Apr. 22, 2004

(30) Foreign Application Priority Data

Mar. 20, 2002 (JP) ............................. 2002-079242

(51) Int. Cl.
*G01R 31/28* (2006.01)

(52) U.S. Cl. ......................................... 714/724; 714/43
(58) Field of Classification Search ................. 714/43, 714/27, 733, 726, 724; 710/306
See application file for complete search history.

(56) References Cited

U.S. PATENT DOCUMENTS

| | | | |
|---|---|---|---|
| 5,138,257 A * | 8/1992 | Katsura ....................... 714/43 |
| 5,247,521 A * | 9/1993 | Akao et al. .................... 714/27 |
| 5,850,512 A * | 12/1998 | Song ............................ 714/43 |
| 5,974,579 A * | 10/1999 | Lepejian et al. ............. 714/733 |
| 6,141,717 A * | 10/2000 | Yamanoi et al. ............. 710/306 |
| 6,324,663 B1 * | 11/2001 | Chambers .................... 714/726 |
| 6,546,507 B1 * | 4/2003 | Coyle et al. ................... 714/43 |
| 6,643,811 B1 * | 11/2003 | Chambers .................... 714/726 |

* cited by examiner

*Primary Examiner*—David Ton
(74) *Attorney, Agent, or Firm*—Staas & Halsey LLP

(57) ABSTRACT

An internal bus testing device for a semiconductor integrated circuit in which an internal bus control circuit and a plurality of modules are linked by a plurality of internal buses. The internal bus testing device includes an area selector which causes the internal bus control circuit to select an address area corresponding to one of the plurality of internal buses. An area address setting unit sets the internal bus control circuit in an internal bus test mode in response to an internal bus test start signal, the area address setting unit storing a state setting signal and a predetermined address value indicating the address area. A control unit supplies, at a start of an internal bus test, the address value from the area address setting unit to the area selector by transmitting the state setting signal from the area address setting unit to the area selector.

12 Claims, 10 Drawing Sheets

INTERNAL BUS TESTING DEVICE AND METHOD

CROSS-REFERENCE TO RELATED APPLICATIONS

This application is based upon and claims the benefit of priority from the prior Japanese Patent Application No. 2002-79242, filed on Mar. 20, 2002, the entire contents of which are hereby incorporated by reference.

BACKGROUND OF THE INVENTION

1. Field of the Invention

The present invention relates to an internal bus testing device and method for a semiconductor integrated circuit, such as a microcontroller.

2. Description of the Related Art

In recent years, various functions and advanced features are demanded for semiconductor integrated circuits such as a microcontroller, and the circuit configuration has become increasingly complicated. For this reason, the process of test verification of semiconductor integrated circuits has also become complicated and the time for performing the test verification is increasing.

As the countermeasure against the problem, a built-in testing circuit for a microcontroller is provided as an internal element of the microcontroller, and it is common to perform test verification using the built-in testing circuit. However, the addition of a testing circuit to the microcontroller will lead to the increase of the chip area or the circuit scale.

On the other hand, making the chip area and the circuit scale small is needed to reduce the cost of the semiconductor integrated circuit. Hence, there is an increasing demand for an semiconductor integrated circuit that is capable of performing by itself the internal bus testing efficiently without using any complicated circuit.

FIG. 1 shows an internal bus testing device for a conventional semiconductor integrated circuit.

In FIG. 1, a microcontroller is assumed as an example of the conventional semiconductor integrated circuit incorporating the internal bus testing device.

The internal bus testing device, shown in FIG. 1, is comprised of a plurality of modules including a CPU 1, an internal bus (IN/BUS) control circuit 2, a direct memory access (DMA) controller 3, an internal memory 4 such as a flash memory, and an external bus (EX/BUS) interface 5.

As shown in FIG. 1, the internal bus testing device includes the plurality of modules which are interconnected by a plurality of internal buses. Specifically, the CPU 1 and the internal bus control circuit 2 are interconnected by the instruction bus (I-BUS) 6 and the data bus (D-BUS) 7. The internal bus control circuit 2 and the internal memory 4 are connected by the internal-memory bus (F-BUS) 8. The internal bus control circuit 2 and the external bus interface 5 are interconnected by the external bus (X-BUS) 9. Furthermore, the internal bus control circuit 2 and the DMA controller 3 connected by the DMA bus (M-BUS) 10. Each of the plurality of internal buses includes the address bus, the data bus, and the control signal bus respectively.

Moreover, in the internal bus testing device of FIG. 1, a lead wire from the port 11 is coupled to an input of the external bus interface 5, and the CPU 1 can receive via the external bus 9 an instruction that is externally supplied to the external bus interface 5 via the port 11.

In the internal bus testing device of FIG. 1, the internal bus control circuit 2 controls the respective internal buses. The CPU 1, the DMA controller 3, and the external bus interface 5 can function as a master module to the related one of the internal buses. When the CPU 1 functions as a master module, the internal memory 4 functions as a slave module to the F-BUS 8 and the external bus interface 5 functions as a slave module to the X-BUS 5.

When the CPU 1 functions as the master module to access a certain module from the related internal bus, it is possible for the internal bus testing device to change the address area of the related internal bus during the internal bus testing. For example, when the CPU 1 accesses from the data bus 7 as the master module, it is possible to change the address area in accordance with a predetermined testing pattern "0h→5h→Fh→Ah→0h". This internal bus testing generally is performed for improvement in the error detection ratio of the semiconductor integrated circuit.

However, in the conventional microcontroller, the access area or destination for each of the plurality of modules is predetermined or fixed for each of the respective internal buses linked to the modules of the internal bus testing device. During the normal operation, it is impossible for the internal bus control circuit 2 to carry out the test verification of several upper-rank bits of the address bus of the related internal bus in the case of outputting the access signal to the slave module. This is because the access area is fixed.

FIG. 10 shows an example of a memory map used by the conventional microcontroller.

In the example of FIG. 10, the address area of 0000_0000h to 0000_FFFFh in the memory map is assigned for the input/output (IO) area 100. The address area of 0001_0000h to 0001_FFFFh is assigned for the I-BUS area 102 corresponding to the instruction bus 6. The address area of 0002_0000h to 0003_FFFFh is assigned for the D-BUS area 104 corresponding to the data bus 7. The address area of 0004_0000h to 000F_FFFFh is assigned for the F-BUS area 106 corresponding to the internal-memory bus 8. The address area of 0010_0000h to FFFF_FFFFh is assigned for the X-BUS area 108 corresponding to the external bus 9.

As described above, in the conventional microcontroller, the access area for each of the respective modules is predetermined for each of the respective internal buses linked to the modules of the internal bus testing device. For example, the address area for the F-BUS 8 is fixed to 000F_FFFFh from 0004_0000h in the conventional semiconductor integrated circuit, and if the internal bus control circuit 2 during the normal operation outputs the access signal through the F-BUS 8 to the internal memory 4 as the slave module, several upper-rank bits of the address bus contained in the F-BUS 8 are meaningless, and the test verification of such bits of the related internal bus is impossible.

In order to perform the above-described internal bus testing, many of conventional semiconductor integrated circuits are provided with a complicated circuit for execution of a test mode. And during the test mode operation, the internal bus testing must be carried out by externally supplying a control signal from external testing equipment to control the internal bus. Therefore, it has been difficult for the user to perform the internal bus testing of the semiconductor integrated circuit by using the actual CPU instructions.

SUMMARY OF THE INVENTION

An object of the present invention is to provide an improved internal bus testing device and method in which the above-described problems are eliminated.

Another object of the present invention is to provide an internal bus testing device and method that performs the internal bus testing of a semiconductor integrated circuit efficiently without using any complicated circuit.

Another object of the present invention is to provide an internal bus testing device and method that enables the user to easily perform the internal bus testing of a semiconductor integrated circuit with the actual CPU instructions used.

The above-mentioned objects of the present invention are achieved by an internal bus testing device for a semiconductor integrated circuit in which an internal bus control circuit and a plurality of modules are linked by a plurality of internal buses, the internal bus testing device comprising: an area selector provided to cause the internal bus control circuit to select an address area corresponding to one of the plurality of internal buses; an area address setting unit setting the internal bus control circuit in an internal bus test mode in response to an internal bus test start signal, the area address setting unit storing a state setting signal and a predetermined address value indicating the address area; and a control unit supplying, at a start of the internal bus test mode, the address value from the area address setting unit to the area selector by transmitting the state setting signal from the area address setting unit to the area selector, wherein the internal bus testing device is provided to access one of the plurality of modules linked to one of the plurality of internal buses, with respect to all address areas assigned to the semiconductor integrated circuit when an arbitrary address area corresponding to one of the plurality of internal buses is selected from among the assigned address areas.

The above-mentioned objects of the present invention are achieved by an internal bus testing method for a semiconductor integrated circuit in which an internal bus control circuit and a plurality of modules are linked by a plurality of internal buses, the internal bus testing method comprising the steps of: providing an area selector which causes the internal bus control circuit to select an address area corresponding to one of the plurality of internal buses; providing an area address setting unit which sets the internal bus control circuit in an internal bus test mode in response to an internal bus test start signal, the area address setting unit storing a state setting signal and a predetermined address value indicating the address area; receiving the internal bus test start signal which is set in ON state and sent to the area address setting unit; and supplying, at a start of an internal bus test, the address value from the area address setting unit to the area selector by transmitting the state setting signal from the area address setting unit to the area selector, wherein one of the plurality of modules linked to one of the plurality of internal buses is accessed with respect to all address areas assigned to the semiconductor integrated circuit when an arbitrary address area corresponding to one of the plurality of internal buses is selected from among the assigned address areas.

According to the present invention, the area address on the internal buses, which cannot be accessed during the normal operation performed by the user, can be easily and arbitrarily set during the internal bus testing of the semiconductor integrated circuit by using the internal bus testing device.

According to the present invention, even if it is the area address that cannot be normally selected among the internal buses, the test verification of the semiconductor integrated circuit at such area address is possible, and the present invention makes it possible to provide efficient internal bus testing of the semiconductor integrated circuit.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be given of preferred embodiments of the present invention with reference to the accompanying drawings.

Figure 2:
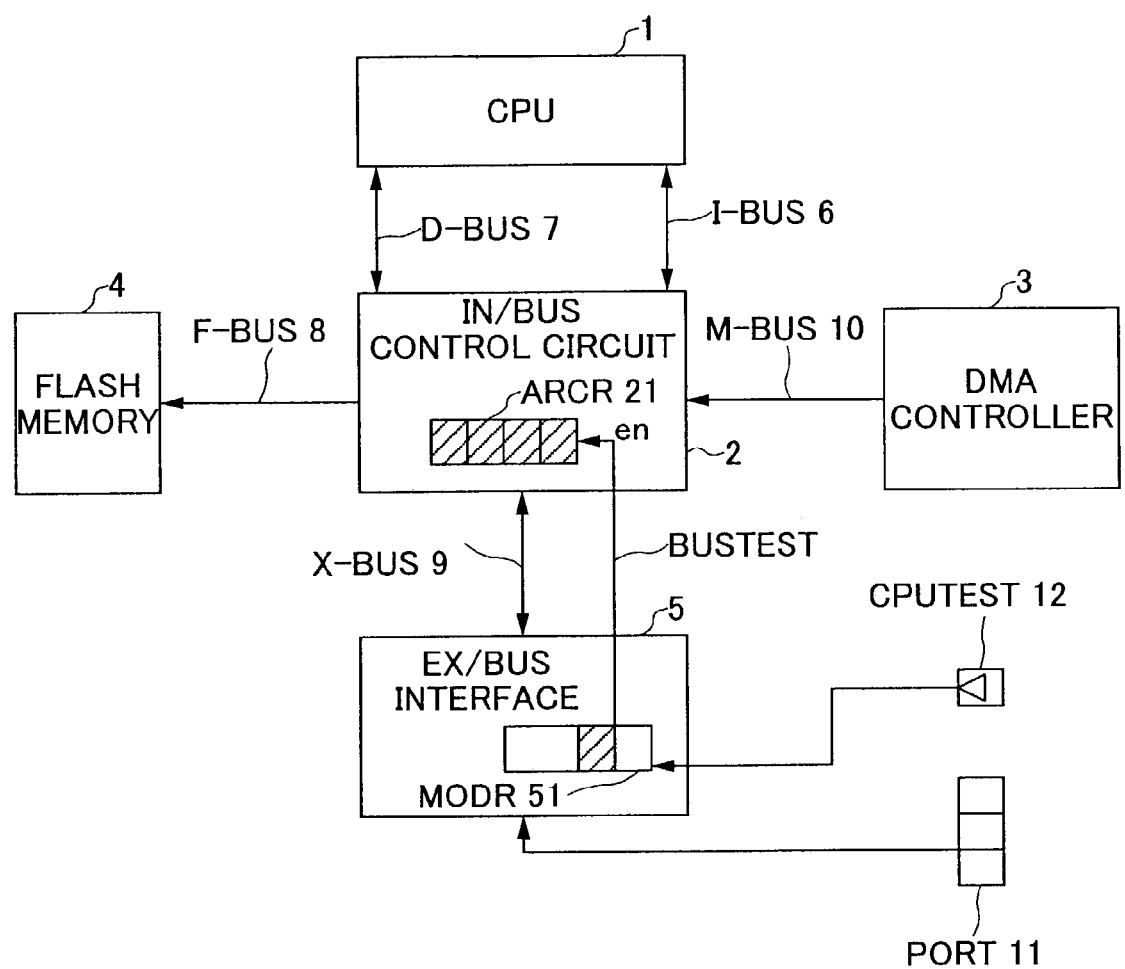
FIG. 2 is a block diagram of an internal bus testing device in one preferred embodiment of the invention.
Figure 3:
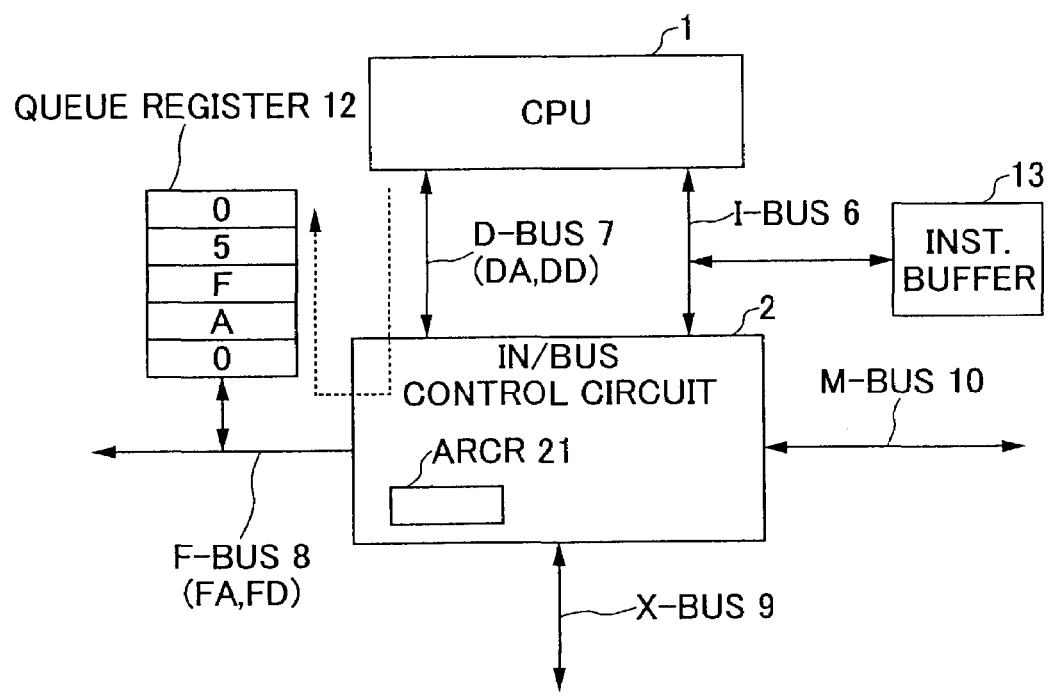
FIG. 3 is a diagram for explaining operation of an internal bus control circuit in the internal bus testing device of FIG. 2.

FIG. 2 is a block diagram of an internal bus testing device in one preferred embodiment of the invention. FIG. 3 is a diagram for explaining operation of the internal bus testing device shown in FIG. 2.

Figure 1:
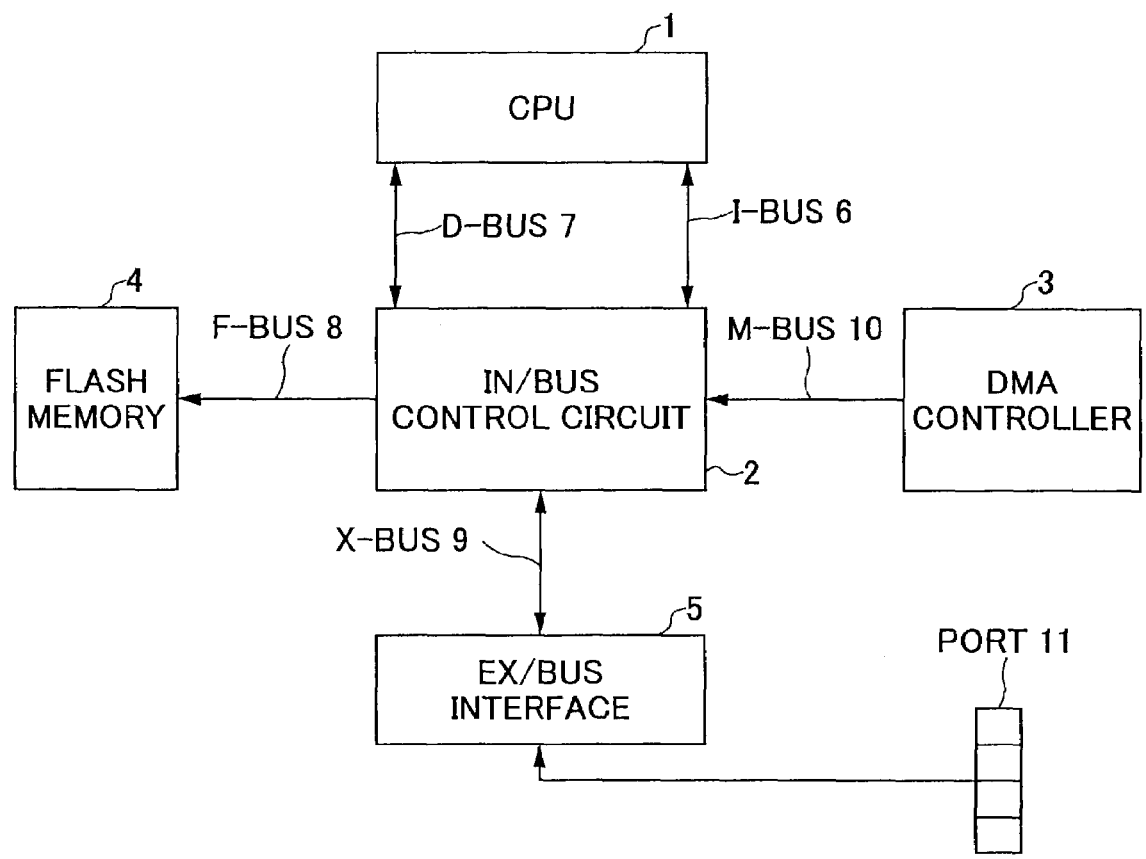
FIG. 1 is a block diagram of an internal bus testing device for a conventional semiconductor integrated circuit.

The internal bus testing device of the present embodiment is incorporated in a semiconductor integrated circuit, such as a microcontroller, similar to the case of FIG. 1.

In FIG. 2 and FIG. 3, the elements which are essentially the same as corresponding elements of the semiconductor integrated circuit in FIG. 1 are designated by the same reference numerals.

As shown in FIG. 2, the internal bus testing device of the present embodiment is comprised of the plurality of modules including the CPU 1, the internal bus (IN/BUS) control circuit 2, the direct memory access (DMA) controller 3, the internal memory 4 such as a flash memory, and the external bus (EX/BUS) interface 5. The plurality of modules are interconnected by the plurality of internal buses. Specifically, the CPU 1 and the internal bus control circuit 2 are interconnected by the instruction bus (I-BUS) 6 and the data bus (D-BUS) 7. The internal bus control circuit 2 and the internal memory 4 are connected by the internal-memory bus (F-BUS) 8. The internal bus control circuit 2 and the external bus interface 5 are interconnected by the external bus (X-BUS) 9. The internal bus control circuit 2 and the DMA controller 3 connected by the DMA bus (M-BUS) 10. Each of the plurality of internal buses includes the address bus, the data bus, and the control signal bus respectively.

Moreover, in the internal bus testing device of FIG. 2, the lead wire from the port 11 is coupled to the input of the external bus interface 5, and the CPU 1 can receive via the external bus 9 an instruction that is externally supplied to the external bus interface 5 via the port 11.

In the embodiment of FIG. 2, the internal bus control circuit 2 controls the respective internal buses. The CPU 1, the DMA controller 3, and the external bus interface 5 can function as a master module to the related one of the internal buses. When the CPU 1 functions as a master module, the internal memory 4 functions as a slave module to the F-BUS 8 and the external bus interface 5 functions as a slave module to the X-BUS 9.

In the present embodiment, when the CPU 1 functions as the master module to access a certain module from the related internal bus, it is possible to change the address area of the related internal bus during the internal bus testing. For example, when the CPU 1 accesses from the data bus 7 as the master module, it is possible to change the address area in accordance with a predetermined testing pattern "0h→5h→Fh→Ah→0h".

Figure 10:
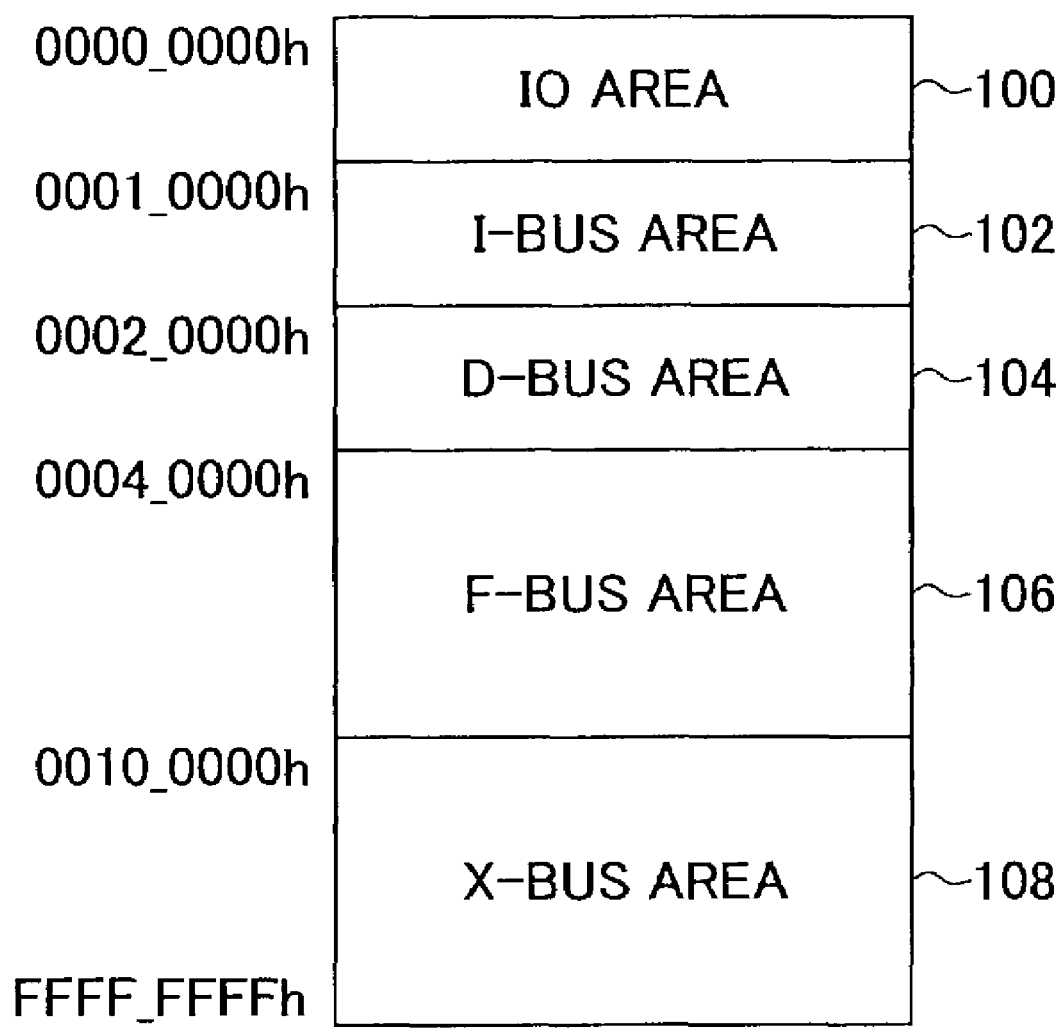
FIG. 10 is a diagram showing an example of a memory map used by a microcontroller.

However, as described previously, in the conventional microcontroller, the access area for each of the plurality of modules is fixed for each of the respective internal buses linked to the modules (FIG. 10), and it is impossible for the internal bus control circuit 2 of FIG. 1 to carry out the test verification of several upper-rank bits of the address bus of the related internal bus in the case of outputting the access signal to the slave module.

In order to solve the problem, in the embodiment of FIG. 2, an area address setting register 21 (which will be called the ARCR register 21) is provided in the internal bus control circuit 2. The internal bus testing device of the present embodiment is configured such that, when starting the internal bus testing, the internal bus control circuit 2 is set, by using the ARCR register 21, into a state in which the internal bus control circuit 2 is capable of setting the address information indicating an arbitrary address area.

Moreover, in the internal bus testing device of FIG. 2, a mode setting register 51 (which will be called the MODR register 51) is provided in the external bus interface 5. By using the MODR register 51, the enable bit for starting the internal bus testing is provided at a predetermined bit position of the MODR register 51. When an external terminal CPUTEST of the internal bus testing device is set in ON state by the user (CPUTEST=1), the enable bit of the MODR register 51 is set in ON state, which causes the internal bus test start signal BUSTEST, which is provided at the related bit of the ARCR register 21, to be set in ON state (BUSTEST=1) as shown in FIG. 2.

When the start signal BUSTEST is set to 1, the ARCR register 21 of the internal bus control circuit 2 is set in the enable state. At this time, the internal bus control circuit 2 is placed in a condition wherein it can arbitrarily change the address area of the related one of the internal buses.

In the following, in order to distinguish the above-mentioned condition of the internal bus control circuit 2 from the normal operation mode, it is called the internal bus test mode.

As shown in FIG. 3, in the present embodiment, the queue register 12 is provided on the internal-memory bus (F-BUS) 8, and the instruction buffer 13 is provided on the instruction bus (I-BUS) 6. When performing the internal bus testing, the data that is supplied from the CPU 1 to the F-BUS 8 is temporarily held by the queue register 12. The internal bus testing device of the present embodiment is configured so that the data held by the queue register 12 can be used to output a verification result of the internal bus testing.

During the internal bus testing, the CPU 1 specifies the area address of the related internal bus, and carries out the test verification by comparing the data, which has been supplied via the D-BUS 7 and the F-BUS 8 to the specified area address of the internal memory 4, with the data held by the queue register 12 as indicated by the dotted line in FIG. 3. The DA portion of the D-BUS 7 contains the specified area address, and the DD portion of the D-BUS 7 contains the supplied data. The FA portion of the F-BUS 8 contains the specified area address, and the FD portion of the F-BUS 8 contains the supplied data. The read or write instruction output from the CPU 1 to the internal bus control circuit 21 is temporarily held by the instruction buffer 13.

By performing the comparison between the data (or the data written to the internal memory 4) in which the arbitrary address area of the internal memory 4 is specified, and the data temporarily held by the queue register 12, the internal bus testing device of the present embodiment makes it possible to easily carry out the test verification for the area address on the internal buses, which cannot be accessed during the normal operation mode performed by the user, during the internal bus testing of the semiconductor integrated circuit.

As described above, the internal bus testing device of the present embodiment makes it possible to arbitrarily set the area address of the internal bus related to the slave module by using the ARCR register 21.

Figure 4:
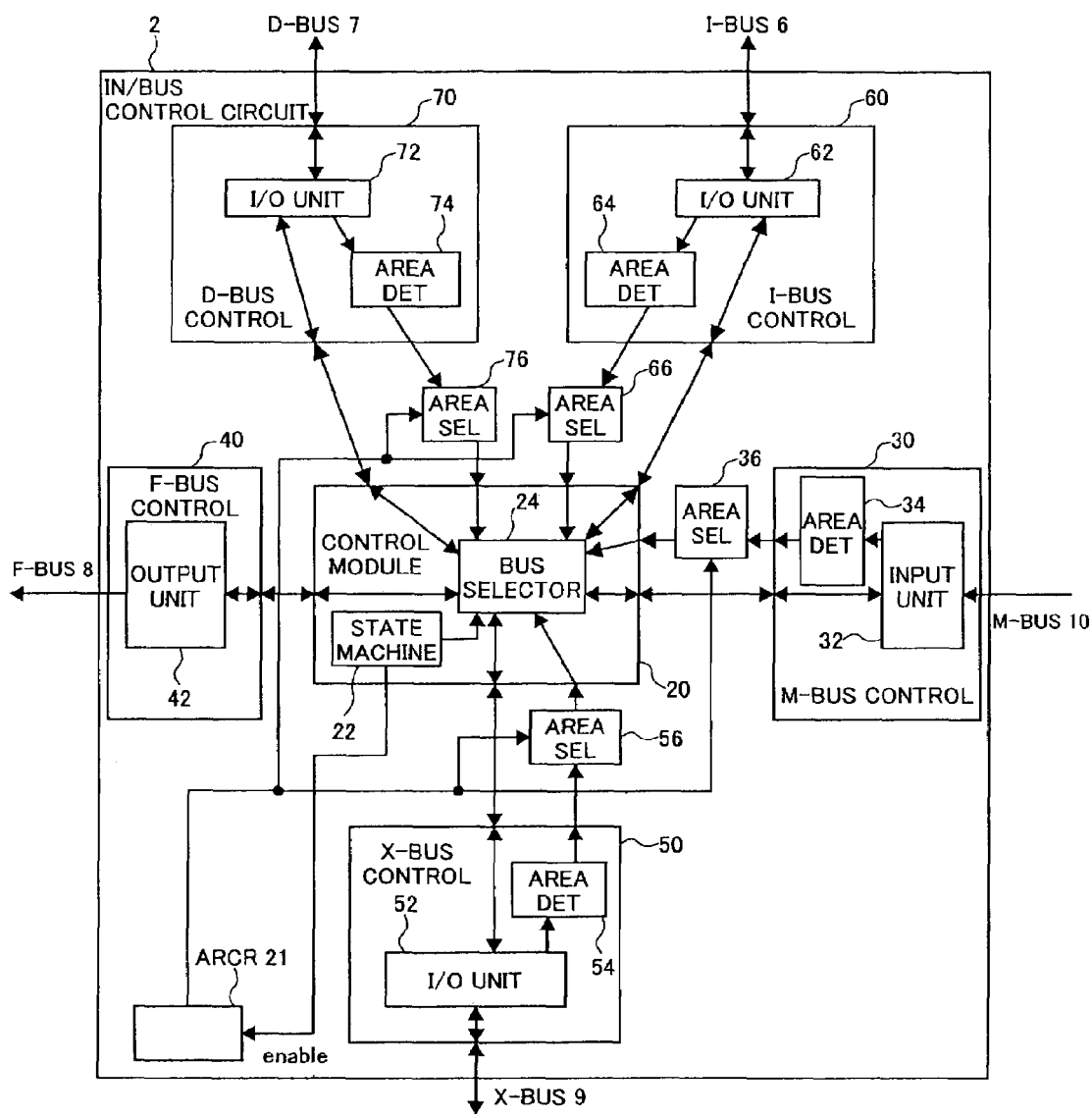
FIG. 4 is a block diagram of the internal bus control circuit shown in FIG. 2.

FIG. 4 shows the composition of the internal bus control circuit 2 of FIG. 2.

As shown in FIG. 4, the internal bus control circuit 2 of the present embodiment generally includes a control module 20, an M-BUS control section 30, an F-BUS control section 40, an X-BUS control section 50, an I-BUS control section 60, and a D-BUS control section 70. The area selectors (AREA SEL) 36, 56, 66 and 76, which correspond to the internal buses 10, 9, 6 and 7 in FIG. 2, are connected to the bus control sections 30, 50, 60 and 70, respectively. The control module 20 includes a state machine 22 coupled to the ARCR register 21, and a bus selector 24 coupled to the area selectors 36, 56, 66 and 76. The state machine 22 is coupled to the bus selector 24. The ARCR register 21 is coupled to each of the area selectors 36, 56, 66 and 76.

Moreover, in the internal bus control circuit 2 of FIG. 4, the M-BUS control section 30 includes an input unit 32 and an area determination unit (AREA DET) 34. The F-BUS control section 40 includes an output unit 42. The X-BUS control section 50 includes an I/O unit 52 and an area determination unit (AREA DET) 54. The I-BUS control section 60 includes an I/O circuit 62 and an area determination unit (AREA DET) 64. The D-BUS control section 70 includes an I/O unit 72 and an area determination unit (AREA DET) 74.

Figure 5:
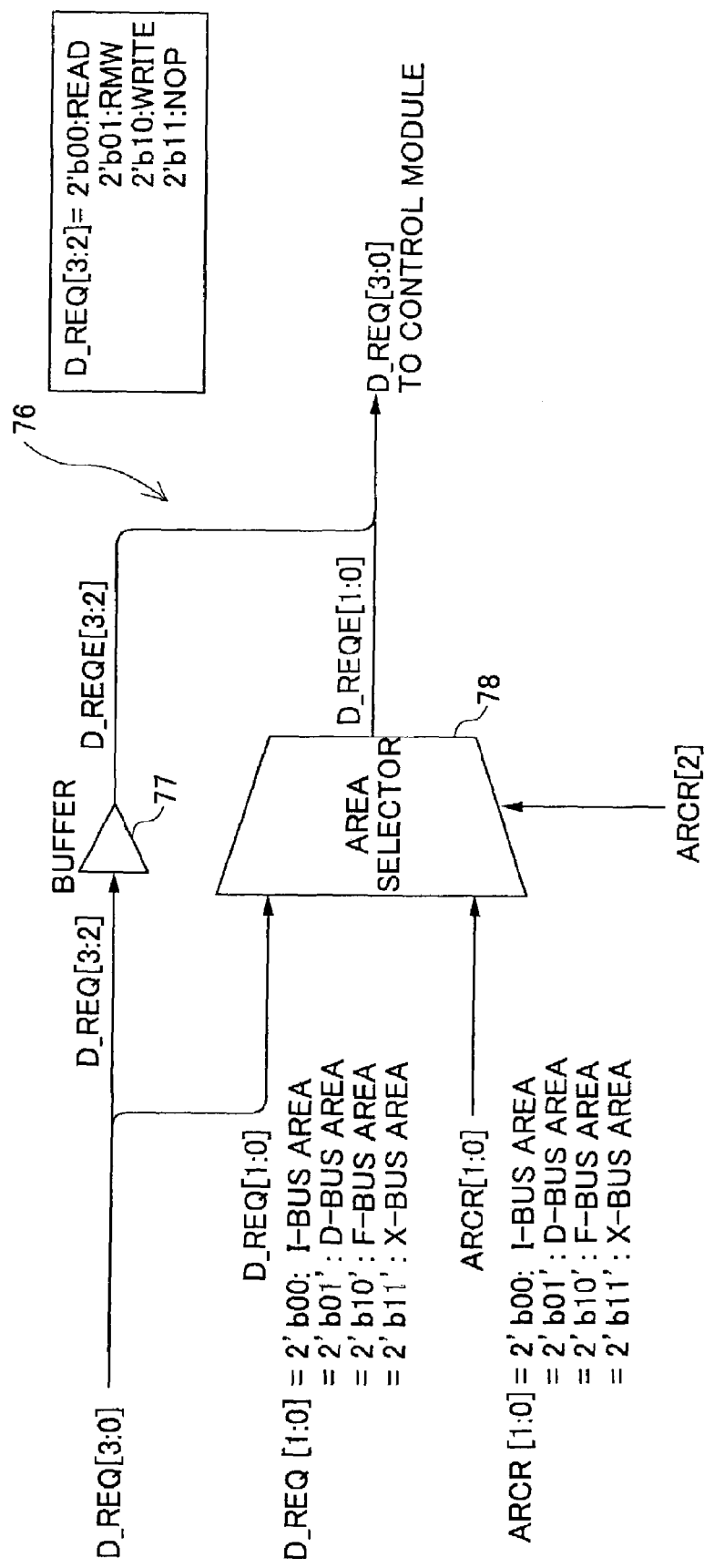
FIG. 5 is a diagram showing an example of an area selector in the internal bus control circuit of FIG. 4.

FIG. 5 shows an example of the area selector in the internal bus control circuit of FIG. 4.

In the example shown in FIG. 5, the area selector 76 is connected at its input to the D-BUS control section 70 and connected at its output to the bus selector 24 of the control module 20. Also, the area selector 76 is connected at its input to the ARCR register 21. The area selector 76 includes a buffer 77 and an area selector 78.

As shown in FIG. 5, the D_REQ is the input request signal that is supplied to the D-BUS control section 70 through the D-BUS 7 by the CPU 1. A portion of the input request signal (or D_REQ [1:0]) is supplied to the area selector 78, while the remaining portion of the input request signal (or D_REQ [3:2]) is supplied to the buffer 77. The D_REQ [3:2] is used to specify one of the four commands READ, RMW, WRITE and NOP. The D_REQ [1:0] is used to specify one of the internal bus areas 102–108 (refer to FIG. 10).

The D_REQE is the output request signal that is supplied to the control module 20 from the area selector 76. The output request signal D_REQE is a combination of the output signal (or D_REQE [3:2]) of the buffer 77 and the output signal (or D_REQE [1:0]) of the area selector 78.

Moreover, in the area selector 76 of FIG. 5, a first output signal (or ARCR [1:0]) of the ARCR register 21 is supplied to the area selector 78. In the present embodiment, an arbitrary address area among the internal bus areas 102–108 (refer to FIG. 10) is specified by the first output signal ARCR [1:0] of the ARCR register 21 at a start of the internal bus test mode. A second output signal (or ARCR [2]) of the ARCR register 21 is supplied to the area selector 78. In the present embodiment, the second output signal ARCR [2] of the ARCR register 21 is used to determine whether the access area is what is specified by the ARCR [1:0] or what is specified by the D_REQ [1:0].

Figure 6:
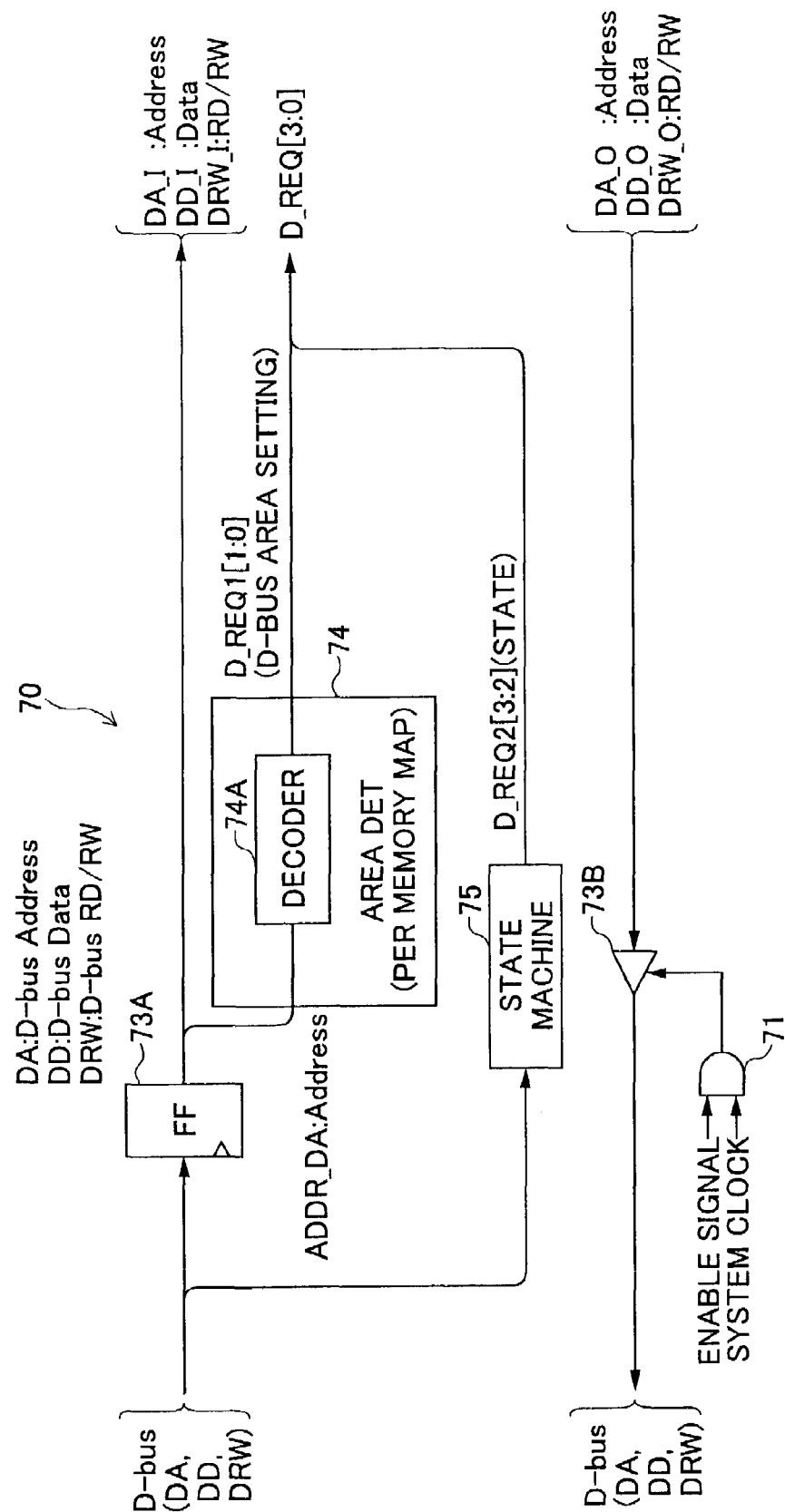
FIG. 6 is a diagram showing an example of a bus control section in the internal bus control circuit of FIG. 4.

FIG. 6 shows an example of the bus control section in the internal bus control circuit of FIG. 4.

As shown in FIG. 6, the D-BUS control section 70 includes an AND gate 71, a three-state buffer 73B, a flip-flop 73A, the area determination unit 74, and a state machine 75.

The AND gate 71 and the buffer 73B serve to send out the output data signal that is supplied to the CPU 1 through the D-BUS 7 from the D-BUS control section 70. The flip-flop 73A, the area determination unit 74 and the state machine 75 serve to send out the request signal D_REQ, which is supplied to the D-BUS control unit 70 through the D-BUS 7 by the CPU 1, to the area selector 76. Moreover, the flip-flop 73A, the area determination unit 74 and the state machine 75 serve to send out the address signal DA_I, the data signal DD_I and the instruction signal DRW_I, which are contained in the D-BUS 7, to the control module 20.

Figure 7:
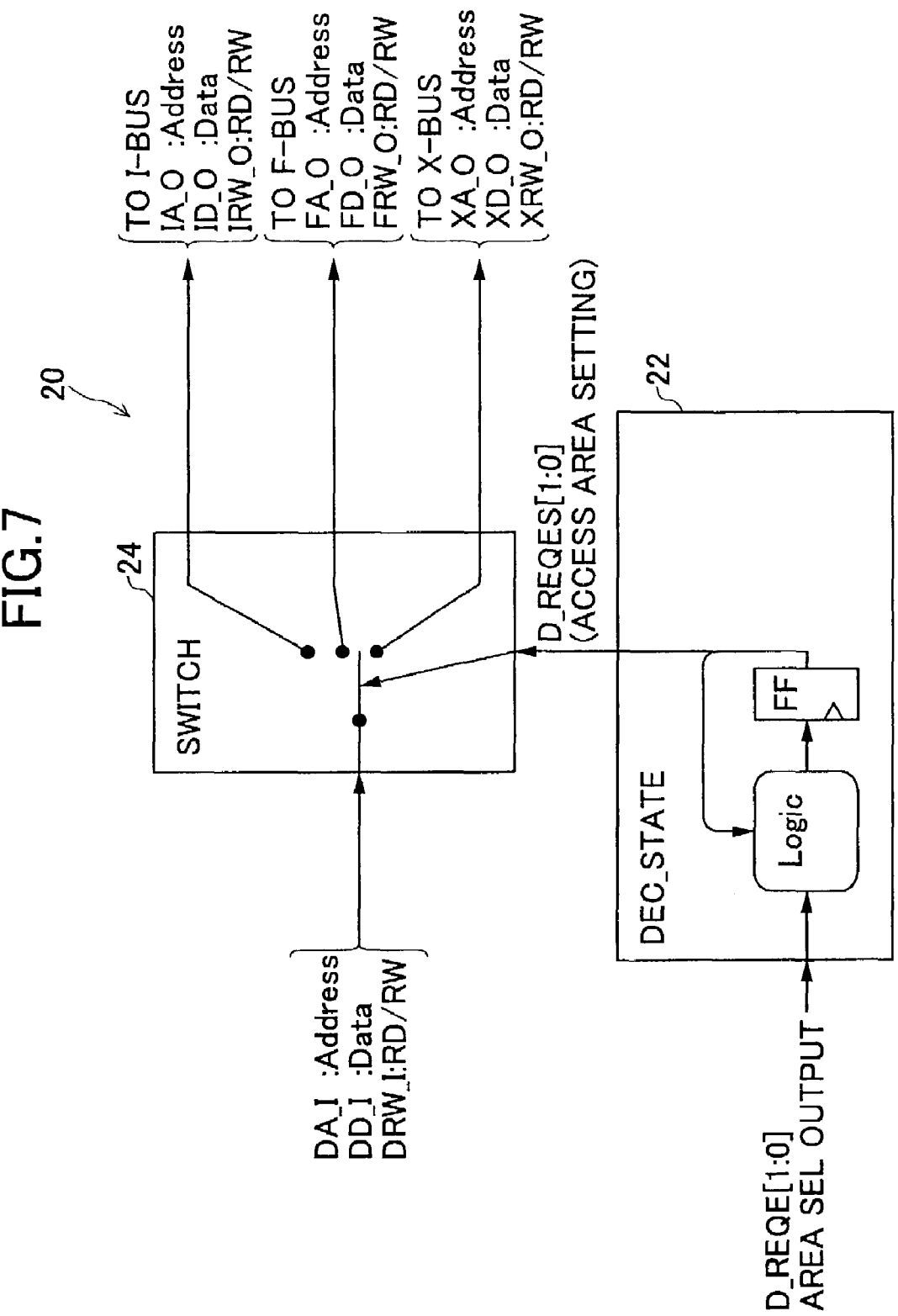
FIG. 7 is a diagram showing an example of a bus selector in the internal bus control circuit of FIG. 4.

FIG. 7 shows an example of the bus selector in the internal bus control circuit of FIG. 4.

For the sake of convenience of description, only a portion of the bus selector 24 which is connected with the D-BUS control section 70 (FIG. 6) and a portion (DEC_STATE) of the state machine 22 which is connected with the area selector 76 (FIG. 5) are shown in FIG. 7.

As shown in FIG. 7, the state machine 22 (DEC_STATE) includes the logical circuit and the flip-flop. The logical circuit receives the output request signal D_REQE [1:0] which is supplied from the area selector 76, and the state machine 22 outputs the signal D_REQES [1:0] to the bus selector 24. The flip-flop temporarily stores the signal D_REQES and functions as a delay unit. The signal D_REQES is used to specify one of the internal bus areas 102, 106 and 108 as the access area.

The bus selector 24 is a switch which specifies the access area based on the signal D_REQES supplied from the state machine 22. The bus selector 24 performs the switching operation in accordance with signal D_REQES, and sends out the address-signal DA_I, the data signal DD_I and the instruction signal DRW_I, which are contained in the D-BUS 7, to the related internal bus (in this case, the F-BUS 8) corresponding to the access area.

Accordingly, when the microcontroller operates in the normal operation mode, the internal bus control circuit 2 of FIG. 4 performs the internal bus control by using the functions of the I/O circuits, the area determination units, and the area selectors. In this case, the access area is fixed similar to the internal bus testing device of FIG. 1.

However, in the internal bus control circuit 2 of the present embodiment, the control module 20 sets a predetermined value into the ARCR register 21 by the write instruction at a start of the internal bus test mode, and the state of the internal bus control circuit 2 is transferred from the normal operation mode to the internal bus test mode. In the internal bus test mode, each bus module is fixed to the address area of the related internal bus in accordance with the predetermined value that is set by the control module 20 and held by the ARCR register 21.

Figure 8:
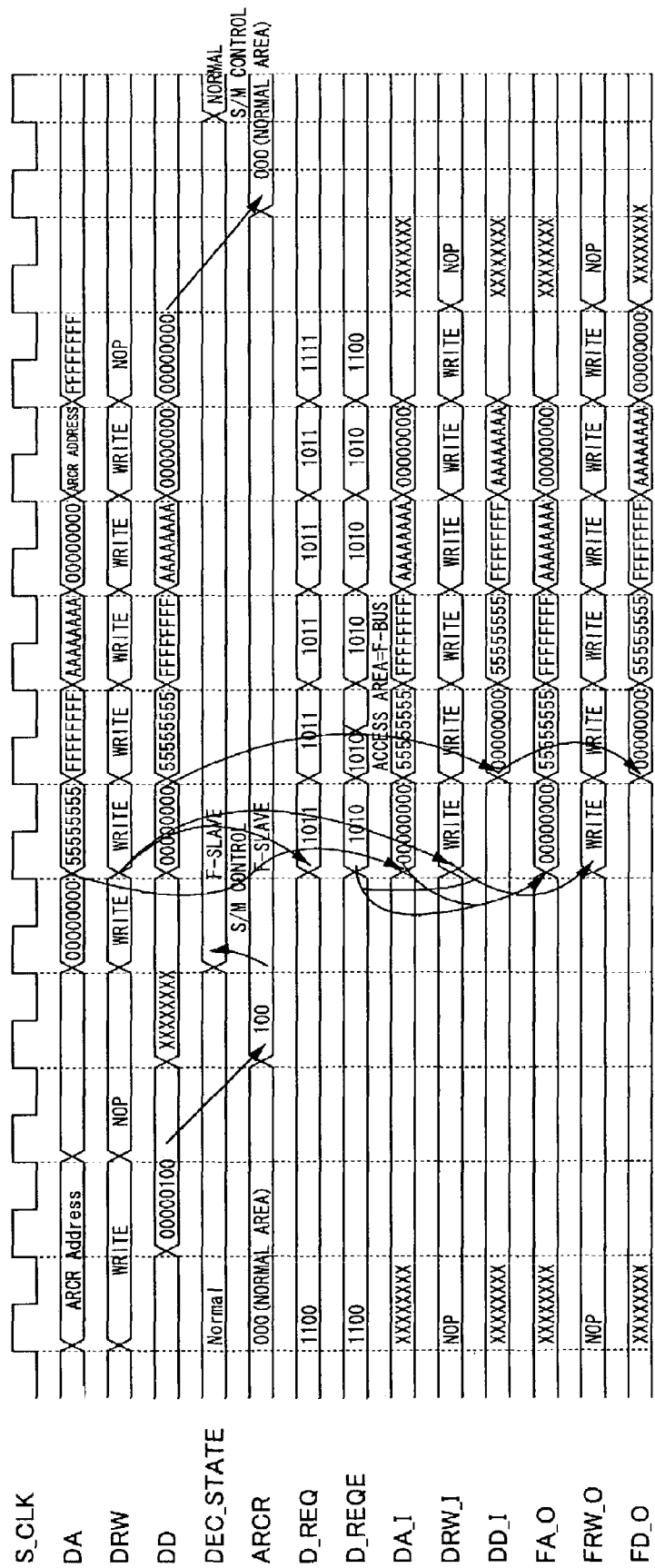
FIG. 8 is a timing chart for explaining the state of the control signals of the internal bus testing device during the internal bus test.

FIG. 8 is a timing chart for explaining the state of the control signals of the internal bus testing device of the present embodiment during the internal bus testing.

For the sake of convenience of description, the case where the internal bus testing of the microcontroller is performed by specifying an arbitrary address area through the output unit 42 of the F-BUS control section 40 from the D-BUS 7 is shown in FIG. 8.

In the timing chart of FIG. 8, the system clock (S_CLK) is supplied to the internal bus control circuit 2 from the CPU 1. The address signal (DA) is supplied through the D-BUS 7 to the internal bus control circuit 2 from the CPU 1. The instruction signal (DRW) is supplied through the D-BUS 7 to the internal bus control circuit 2 from the CPU 1. The data signal (DD) is supplied through the D-BUS 7 to the internal bus control circuit 2 from the CPU 1. The signal (DEC_STATE) indicates the state of the state machine 22. The signal (ARCR) indicates the value held by the ARCR register 21. The input request signal (D_REQ) is supplied to the D-BUS control section 70 through the D-BUS 7 from the CPU 1. The output request signal (D_REQE) is supplied from the area selector 76 to the control module 20.

Furthermore, the timing chart of FIG. 8, the address signal (DA_I) is supplied from the control module 20 to the output unit 42. The instruction signal (DRW_I) is supplied from the control module 20 to the output unit 42. The data signal (DD_I) is supplied from the control module 20 to the output unit 42. The address signal (FA_O) is supplied from the output unit 42 to the F-BUS 8. The instruction control signal (FRW_O) is supplied the output unit 42 to the F-BUS 8. The data signal (FD_O) is supplied from the output unit 42 to the F-BUS 8.

As shown in FIG. 8, the control module 20 sets up the area selectors 66 and 76 by writing "100" to the ARCR register 21, so that the F-BUS area 106 (FIG. 10) is always selected as the access area.

As the predetermined value ("100") is set in the ARCR register 21, the control module 20 causes the state of the state machine 22 to be transferred from the normal operation mode to the F-slave mode after checking the state where each internal bus has not been accessed according to the state of the internal buses.

Then, the execution of the internal bus testing of the microcontroller is started. For example, when the CPU 1 accesses the internal memory 4 from the data bus (D-BUS) 7 as the master module, the CPU 1 changes the area address in accordance with a predetermined testing address pattern "00000000h→55555555h→FFFFFFFFh→AAAAAAAAh→00000000h".

The signal sent from the CPU 1 to the data bus 7 is supplied to the internal memory 4 through the internal bus control circuit 2 and the F-BUS 8 while it is held temporarily by the queue register 12 provided on the F-BUS 8.

Before the end of the internal bus testing, the control module 20 writes a predetermined value to the ARCR register 21, which causes the internal bus control circuit 2 to be returned from the internal bus test mode to the normal operation mode. For example, the control module 20 returns the internal bus control circuit 2 to the normal operation mode by setting "000" to the ARCR register 21.

Then, the CPU 1 reads the queue register 12 and performs the comparison between the data written to the internal memory 4 in which the arbitrary address area of the internal memory 4 is specified, and the data temporarily held by the queue register 12, in order to carry out the test verification for the area address.

Figure 9:
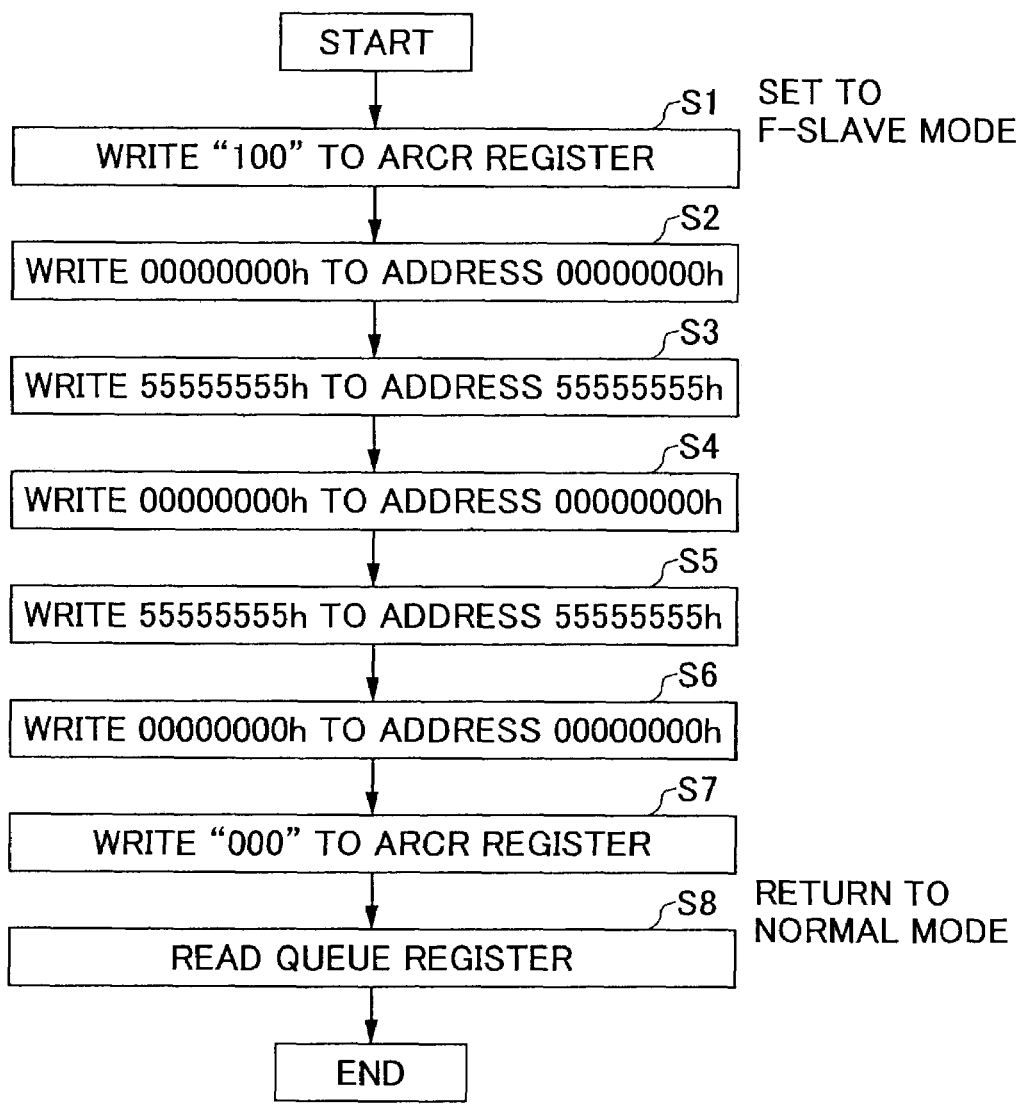
FIG. 9 is a flowchart for explaining the internal bus testing method in one preferred embodiment of the invention.

FIG. 9 is a flowchart for explaining the internal bus testing method in one preferred embodiment of the invention.

The internal bus testing procedure in the present embodiment is started when it is detected that the external terminal CPUTEST is set in ON state and the start signal BUSTEST of the internal bus testing, which is supplied to the ARCR register 21 from the MODR register 51 of the external bus interface 5, is set in ON state.

At a start of the execution of the internal bus testing method of FIG. 9, the CPU 1 writes "100" to the ARCR register 21 by controlling the control module 20 (S1). This causes the state (DEC_STATE) of the state machine 22 to be transferred from the normal operation mode to the F-slave mode (or, the internal bus test mode).

Moreover, the area selector 76 is set so that the F-BUS area is always selected as the access area.

As the internal bus test mode is started, the CPU 1 sends out "00000000h" as a data signal to the internal memory 4 through the I-BUS 6 and the D-BUS 7, and writes it to the address "00000000h" of the internal memory 4 (S2).

Next, the CPU 1 sends out "55555555h" as a data signal to the internal memory 4 through the I-BUS 6 and the D-BUS 7, and writes it to the address "55555555h" of the internal memory 4 (S3).

Next, the CPU 1 sends out "00000000h" as a data signal to the internal memory 4 through the I-BUS 6 and the D-BUS 7, and writes it to the address "00000000h" of the internal memory 4 (S4).

Next, the CPU 1 sends out "55555555h" as a data signal to the internal memory 4 through the I-BUS 6 and the D-BUS 7, and writes it to the address "55555555h" of the internal memory 4 (S5).

Next, the CPU 1 sends out "00000000h" as a data signal to the internal memory 4 through the I-BUS 6 and the D-BUS 7, and writes it to the address "00000000h" of the internal memory 4 (S6).

Before ending the internal bus testing, the CPU 1 writes "000" to the ARCR register 21 by controlling the control module 20 (S7). This causes the state (DEC_STATE) of the state machine 22 to be returned back to the normal operation mode from the F-slave state.

Finally, the CPU 1 reads the queue register 12 and performs the comparison between the data written to the internal memory 4 in which the arbitrary address area of the internal memory 4 is specified, and the data temporarily held by the queue register 12, in order to carry out the test verification for the area address of the internal memory 4 (S8).

According to the internal bus testing method of the present embodiment, the area address on the internal buses of the semiconductor integrated circuit, which cannot be accessed during the normal operation performed by the user, can be easily set during the internal bus testing by using the internal bus testing method.

According to the present embodiment, even if it is the area address that cannot be normally selected among the internal buses of the semiconductor integrated circuit, the test verification of the semiconductor integrated circuit at such area address is possible, and the internal bus testing method of the present embodiment makes it possible to provide efficient internal bus testing.

The present invention is not limited to the above-described embodiments, and variations and modifications may be made without departing from the scope of the present invention.

Further, the present invention is based on Japanese priority application No. 2002-79242, filed on Mar. 20, 2002, the entire contents of which are hereby incorporated by reference.

What is claimed is:

1. An internal bus testing device for a semiconductor integrated circuit in which an internal bus control circuit and a plurality of modules are linked by a plurality of internal buses, comprising:

an area selector provided to cause the internal bus control circuit to select an address area corresponding to one of the plurality of internal buses;

an area address setting unit setting the internal bus control circuit in an internal bus test mode in response to an internal bus test start signal, the area address setting unit storing a state setting signal and a predetermined address value indicating the address area; and a control unit supplying, at a start of an internal bus test, the address value from the area address setting unit to the area selector by transmitting the state setting signal from the area address setting unit to the area selector, wherein the internal bus testing device is provided to access one of the plurality of modules linked to one of the plurality of internal buses, with respect to all address areas assigned to the semiconductor integrated circuit when an arbitrary address area corresponding to one of the plurality of internal buses is selected from among the assigned address areas.

2. The internal bus testing device of claim 1 further comprising a test start unit generating the internal bus test start signal in accordance with a state of an external terminal, the test start unit outputting the internal bus start signal to the area address setting unit.

3. The internal bus testing device of claim 1 further comprising a register provided to temporarily store data which is supplied to said one of the plurality of internal buses linked to the accessed one of the plurality of modules, the register outputting the stored data which is used to generate a verification result of the internal bus testing.

4. The internal bus testing device of claim 1 wherein the control unit comprises a bus selector connected to the area selector, and a state machine connected to the area address setting unit.

5. An internal bus testing device for a semiconductor integrated circuit in which an internal bus control circuit and a plurality of modules are linked by a plurality of internal buses, comprising:

a plurality of area selectors each provided to cause the internal bus control circuit to select an address area corresponding to a particular one of the plurality of internal buses;

an area address setting unit setting the internal bus control circuit in an internal bus test mode in response to an internal bus test start signal, the area address setting unit storing a state setting signal and a predetermined address value indicating an address area for a particular one of the plurality of area selectors; and a control unit supplying, at a start of an internal bus test, the address value from the area address setting unit to the particular one of the plurality of area selectors by transmitting the state setting signal from the area address setting unit to the particular area selector, wherein the internal bus testing device is provided to access one of the plurality of modules linked to one of the plurality of internal buses, with respect to all address areas assigned to the semiconductor integrated circuit when an arbitrary address area corresponding to one of the plurality of internal buses is selected from among the assigned address areas.

6. The internal bus testing device of claim 5 further comprising a register provided on each of the plurality of internal buses to temporarily store data which is supplied to one of the plurality of internal buses linked to the accessed one of the plurality of modules, the register outputting the stored data which is used to generate a verification result of the internal bus testing.

7. An internal bus testing method for a semiconductor integrated circuit in which an internal bus control circuit and a plurality of modules are linked by a plurality of internal buses, the internal bus testing method comprising the steps of:
   providing an area selector which causes the internal bus control circuit to select an address area corresponding to one of the plurality of internal buses;
   providing an area address setting unit which sets the internal bus control circuit in an internal bus test mode in response to an internal bus test start signal, the area address setting unit storing a state setting signal and a predetermined address value indicating the address area;
   receiving the internal bus test start signal which is set in ON state and sent to the area address setting unit; and
   supplying, at a start of an internal bus test, the address value from the area address setting unit to the area selector by transmitting the state setting signal from the area address setting unit to the area selector,
   wherein one of the plurality of modules linked to one of the plurality of internal buses is accessed with respect to all address areas assigned to the semiconductor integrated circuit when an arbitrary address area corresponding to one of the plurality of internal buses is selected from among the assigned address areas.

8. The internal bus testing method of claim 7 further comprising the step of outputting the internal bus test start signal to the area address setting unit in accordance with a state of an external terminal.

9. The internal bus testing method of claim 7 further comprising the steps of:
   providing a register which temporarily stores data supplied to said one of the plurality of internal buses linked to the accessed one of the plurality of modules; and
   outputting the stored data of the register which is used to generate a verification result of the internal bus testing.

10. An internal bus testing method for a semiconductor integrated circuit in which an internal bus control circuit and a plurality of modules are linked by a plurality of internal buses, the internal bus testing method comprising the steps of:
    providing a plurality of area selectors each of which causes the internal bus control circuit to select an address area corresponding to a particular one of the plurality of internal buses;
    providing an area address setting unit which sets the internal bus control circuit in an internal bus test mode in response to an internal bus test start signal, the area address setting unit storing a state setting signal and a predetermined address value indicating an address area for a particular one of the plurality of area selectors;
    supplying, at a start of an internal bus test, the address value from the area address setting unit to the particular one of the plurality of area selectors by transmitting the state setting signal from the area address setting unit to the particular area selector,
    wherein the internal bus testing device is provided to access one of the plurality of modules linked to one of the plurality of internal buses, with respect to all address areas assigned to the semiconductor integrated circuit when an arbitrary address area corresponding to one of the plurality of internal buses is selected from among the assigned address areas.

11. The internal bus testing method of claim 10 further comprising the step of outputting the internal bus test start signal to the area address setting unit in accordance with a state of an external terminal.

12. The internal bus testing method of claim 10 further comprising the steps of:
    providing a register which temporarily stores data supplied to said one of the plurality of internal buses linked to the accessed one of the plurality of modules; and
    outputting the stored data of the register which is used to generate a verification result of the internal bus testing.

* * * * *